(12) United States Patent
Kurabe et al.

(10) Patent No.: US 6,540,065 B2
(45) Date of Patent: Apr. 1, 2003

(54) TRANSFERRING APPARATUS FOR CHIPS AND METHOD OF USE

(75) Inventors: Miki Kurabe, Kusatsu (JP); Satoshi Sawa, Kanazawa (JP); Tetsuichi Inoue, Kyoto (JP)

(73) Assignee: Murata Manufacturing Co., Ltd., Nagaokakyo (JP)

( * ) Notice: Subject to any disclaimer, the term of this patent is extended or adjusted under 35 U.S.C. 154(b) by 0 days.

(21) Appl. No.: 09/918,640

(22) Filed: Aug. 1, 2001

(65) Prior Publication Data

US 2002/0050443 A1 May 2, 2002

(30) Foreign Application Priority Data

Aug. 28, 2000 (JP) ........................................ 2000-257202

(51) Int. Cl.$^7$ ............................................... B65G 37/00
(52) U.S. Cl. ............................... 198/471.1; 198/478.1; 198/482.1; 198/483.1; 198/493
(58) Field of Search ............................. 198/438, 471.1, 198/478.1, 482.1, 483.1, 493, 689.1

(56) References Cited

U.S. PATENT DOCUMENTS

| | | | | |
|---|---|---|---|---|
| 3,583,548 A | * | 6/1971 | Cadwallader | 198/471.1 |
| 4,722,432 A | * | 2/1988 | Staton | 198/471.1 |
| 5,152,390 A | * | 10/1992 | Kubota et al. | 198/463.4 |
| 6,025,567 A | * | 2/2000 | Brooks | 209/574 |
| 6,227,345 B1 | * | 5/2001 | Miyamoto | 198/392 |
| 2001/0013486 A1 | | 8/2001 | Yamakawa | |

FOREIGN PATENT DOCUMENTS

| | | |
|---|---|---|
| GB | 2 341 176 | 3/2000 |
| JP | 090298389 | 11/1997 |
| JP | 110139553 | 5/1999 |

\* cited by examiner

Primary Examiner—Khoi H. Tran
(74) Attorney, Agent, or Firm—Burns, Doane, Swecker & Mathis, LLP

(57) ABSTRACT

A measuring and classifying apparatus (transferring apparatus) for chips includes an immovable base and a turn table (transferring member). The turn table is rotatably disposed on an upper surface of the immovable base, and is provided with receiving concavities for receiving chips with the immovable base and suction passes for chucking the chips. The chips are transferred above the immovable base while being chucked in the receiving concavities. The suction passes are formed at the upper corner portions of the receiving concavities, so that the chips are chucked in such a manner that gaps are provided between the chips and the upper surface of the immovable base.

10 Claims, 6 Drawing Sheets

MEASURING INSTRUMENT

TRANSFERRING APPARATUS FOR CHIPS AND METHOD OF USE

This application is related and claims priority under 35 U.S.C. § 119 to Japanese Patent Application Number 2000-257202, filed Aug. 28, 2000, the entire contents of which are incorporated by reference herein.

BACKGROUND OF THE INVENTION

1. Field of the Invention

The present invention relates to a transferring apparatus for chips in which the chips are transferred above an immovable base while being chucked in receiving concavities formed in a transferring member.

2. Description of the Related Art

Conventionally, with respect to measuring and classifying apparatuses in which electrical characteristics of chip-type electronic components are measured and non-defective articles are selected therefrom, an apparatus configured as shown in FIGS. 8 to 11b is known. This measuring and classifying apparatus is constructed such that a turntable 51, which serves as a transferring member, is rotatably disposed on an upper surface 50a of an immovable base 50. The turntable 51 is provided with receiving concavities 51a for receiving chips 52 at the periphery thereof.

In the measuring and classifying apparatus of FIGS. 8–11b, the chips 52 are supplied to the receiving concavities 51a at a supply station, and the turntable 51 is turned in a direction shown by the arrow in FIGS. 8 and 9 while the chips 52 are being chucked by a vacuum source. Accordingly, the chips 52 are sequentially transferred to work stations A, B, and C. Predetermined operations, such as measurements, tests, processings, etc., are performed in the work stations A, B, and C, and the chips 52 are then transferred to an output station.

In addition, each of the receiving concavities 51a formed in the turntable 51 is provided with a suction pass 51b, which is connected to the vacuum source, at a lower corner thereof. Thus, the chips 52 are positioned at the lower corners of the receiving concavities 51a while they are being chucked therein.

However, as shown in FIG. 11A, in the above-described conventional measuring and classifying apparatus, electrodes 52a of the chip 52 slide on the upper surface 50a of the immovable base 50 while the chip 52 is being transferred. Thus, scratches may be formed on the electrodes 52a as shown in FIG. 11B, and soldering defects may occur in a mounting process due to the scratches formed on the surfaces of the electrodes 52a. Accordingly, this disadvantage needs to be overcome in order to increase quality reliability.

SUMMARY OF THE INVENTION

In view of the above-described situation, an object of the present invention is to provide a transferring apparatus for chips with which the scratches can be avoided while the chips are being transferred and mounting defects are thereby prevented.

According to the present invention, a transferring apparatus for chips includes an immovable base and a transferring member which is moveably disposed on the immovable base, and which is provided with receiving concavities for receiving the chips and vacuum suction passes for chucking the chips. The chips are transferred above the immovable base while being chucked in the receiving concavities, and the chips are chucked inside the receiving concavities at the other side relative to the immovable base.

The chips may be chucked in such a manner that gaps are provided between the chips and the immovable base.

In addition, compressed air outlets for expelling the chips may be formed in the receiving concavities.

In addition, the upper sides of the receiving concavities formed in the transferring member may be covered by an upper plate, and a low-friction sheet may be disposed between the upper plate and the chips.

In addition, the upper plate may be formed of an elastic body which absorbs an impact force applied to the chips from below.

Accordingly, since the chips are chucked inside the receiving concavities at the other side relative to the immovable base, the chips are transferred while being lifted above the immovable base. Thus, the chips can be prevented from sliding on the immovable base and scratches can be prevented from forming on the electrodes. Therefore, soldering defects in a mounting process can be prevented, and the quality reliability can be increased.

In addition, when the chips are chucked in such a manner that gaps are provided between the chips and the immovable base, the chips are reliably prevented from sliding on the immovable base. Thus, the quality reliability can further be increased.

In addition, when the compressed air outlets are formed in the receiving concavities, the chips are easily taken out from the receiving concavities.

In addition, when the upper sides of the receiving concavities are covered by the upper plate and a low-friction sheet is disposed between the upper plate and the chips, the chips can smoothly be chucked without being entrapped, etc., and easily and reliably be positioned.

In addition, when the upper plate is formed of an elastic body, the impact force applied to the chips from below can be absorbed, so that the chips do not directly receive the impact force. For example, when probe pins, etc., are projected upward from the immovable base and the electrical characteristics of the chips are measured, the chips are prevented from directly receiving the impact force applied by the probe pins.

DESCRIPTION OF THE PREFERRED EMBODIMENTS

An embodiment of the present invention will be described below with reference to the attached drawings.

A transferring apparatus according to the present invention is suitable as a measuring and classifying apparatus in which chip-type electronic components are classified by measuring the electrical characteristics thereof. Thus, an example in which a transferring apparatus is applied to a measuring and classifying apparatus will be described below.

Figure 1:
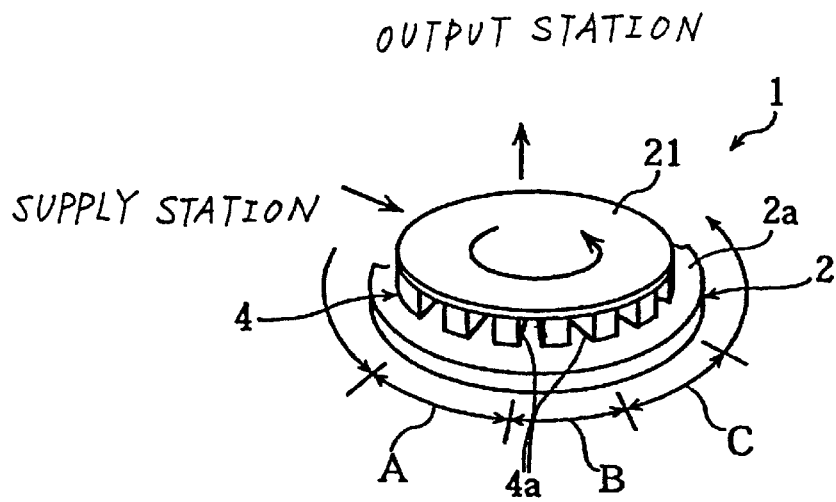
FIG. 1 is a schematic diagram of a measuring and classifying apparatus for chips according to an embodiment of the present invention.
Figure 2:
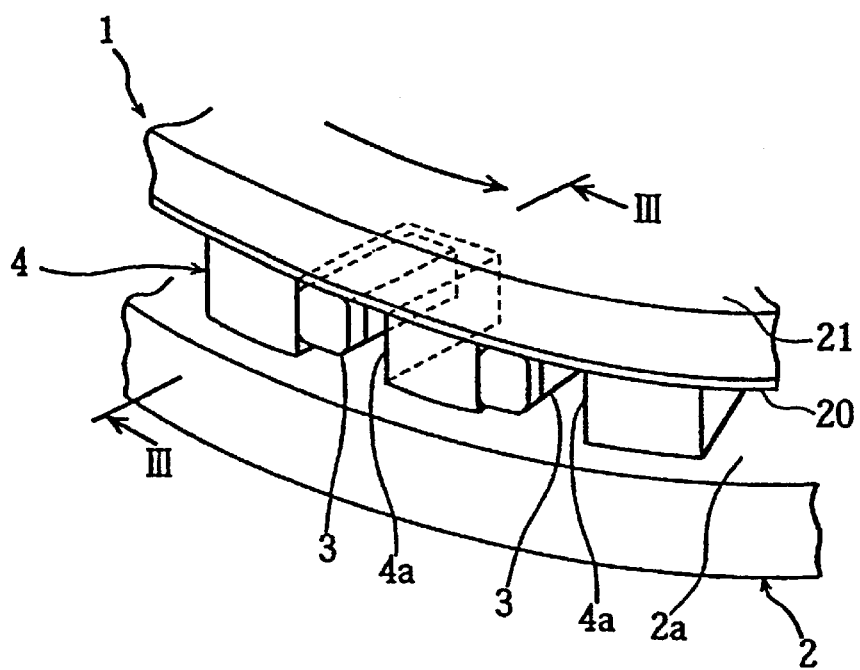
FIG. 2 is a perspective view of chip receiving portions of the measuring and classifying apparatus.
Figure 3:
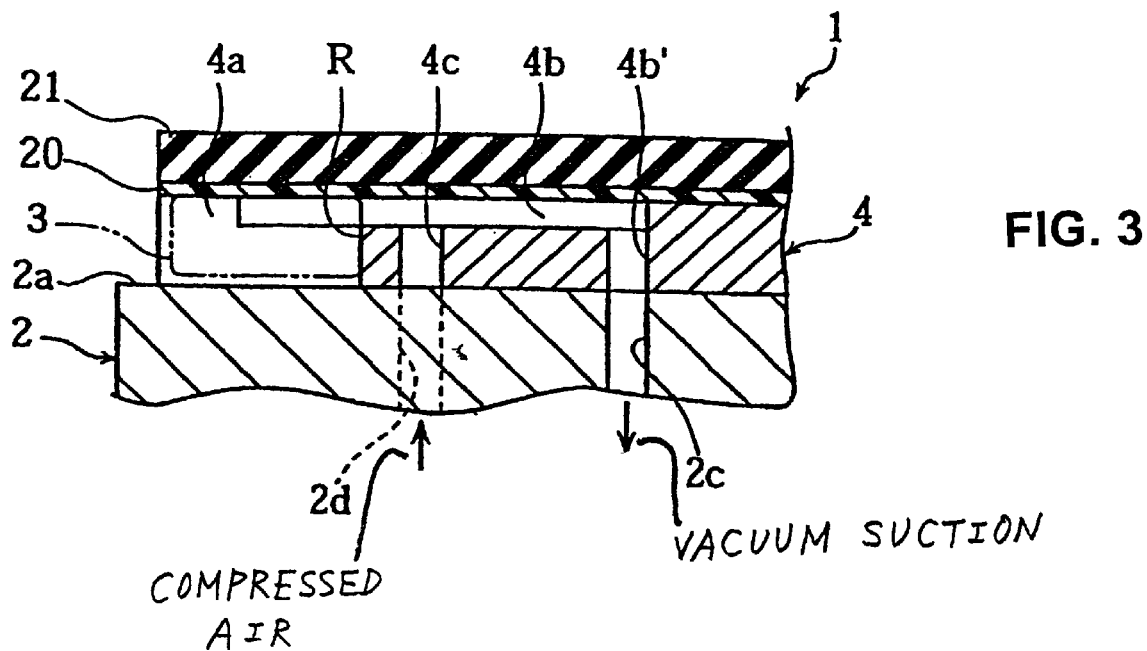
FIG. 3 is a cross-sectional view of the chip receiving portion (a sectional view of FIG. 2 cut along line III—III)
Figure 4:
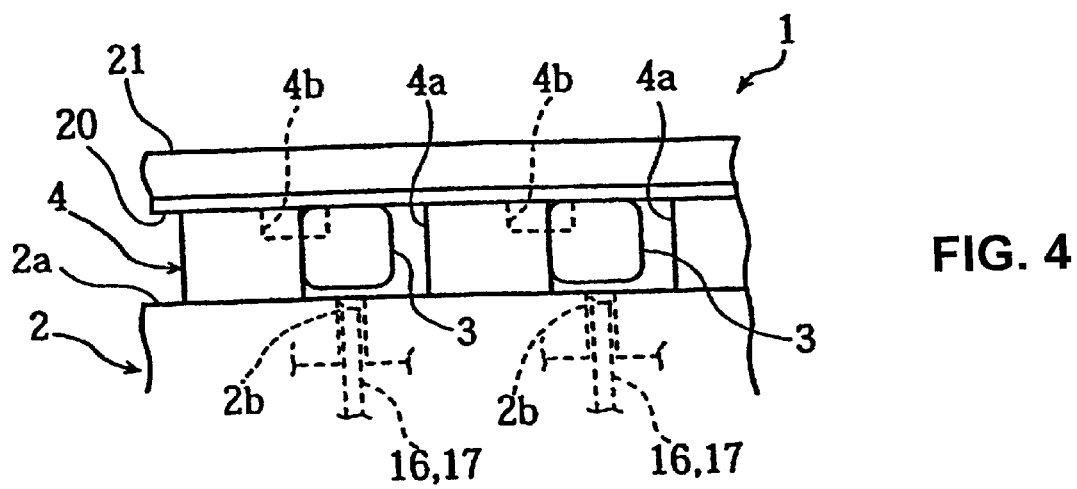
FIG. 4 is a front elevational view of the chip receiving portions.
Figure 5:
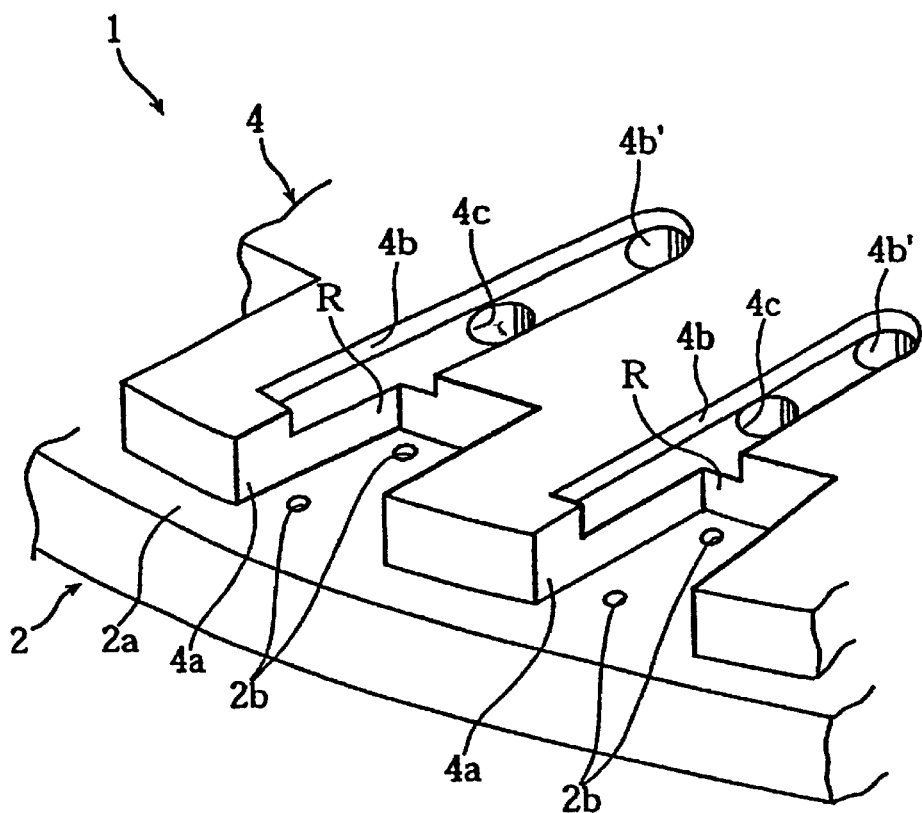
FIG. 5 is a perspective view of a turntable incorporated in the measuring and classifying apparatus.
Figure 6:
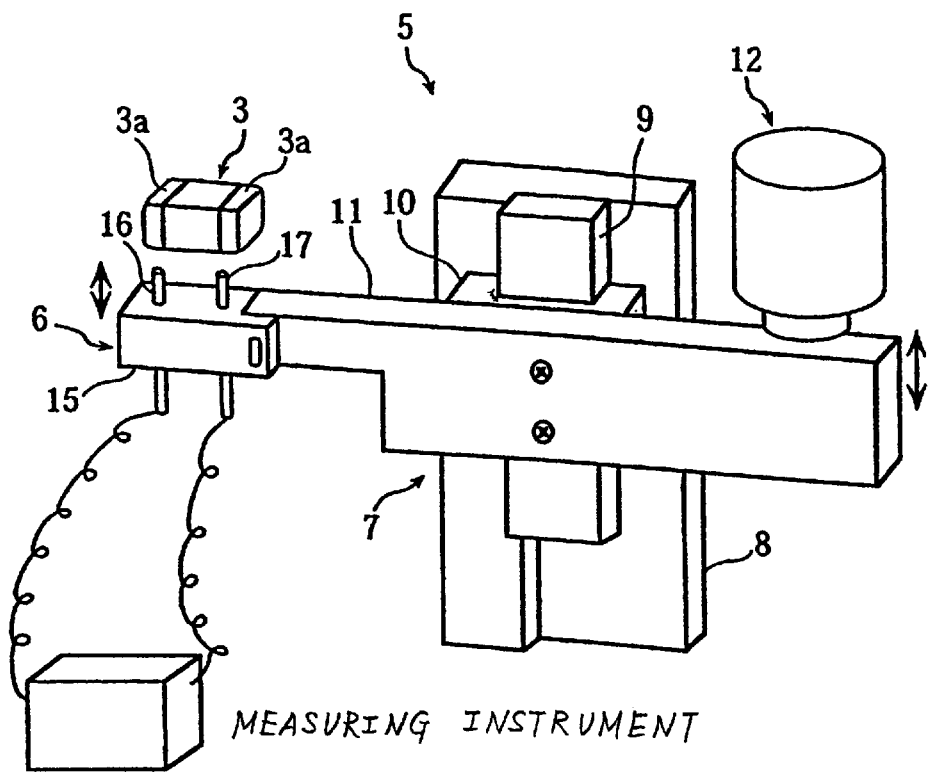
FIG. 6 is a perspective view of a measuring device incorporated in the measuring and classifying apparatus.
Figure 7:
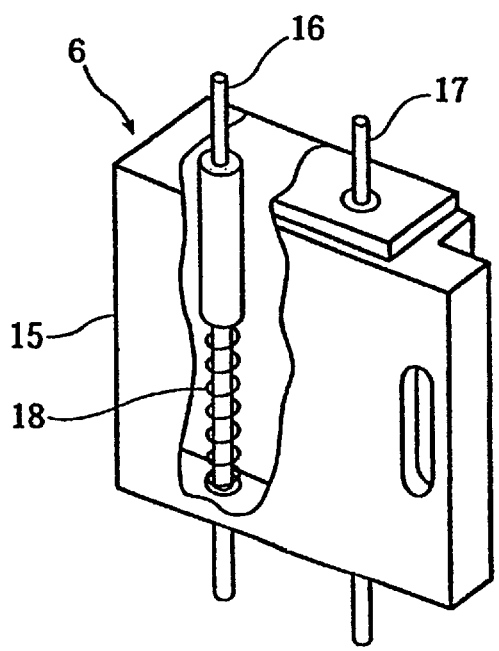
FIG. 7 is a perspective view of a probe unit incorporated in the measuring device.
Figure 8:
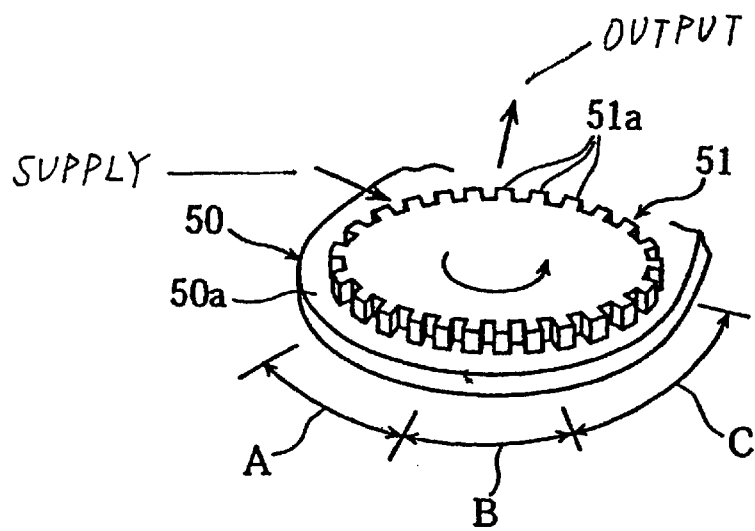
FIG. 8 is a schematic diagram of a typical conventional measuring and classifying apparatus.
Figure 9:
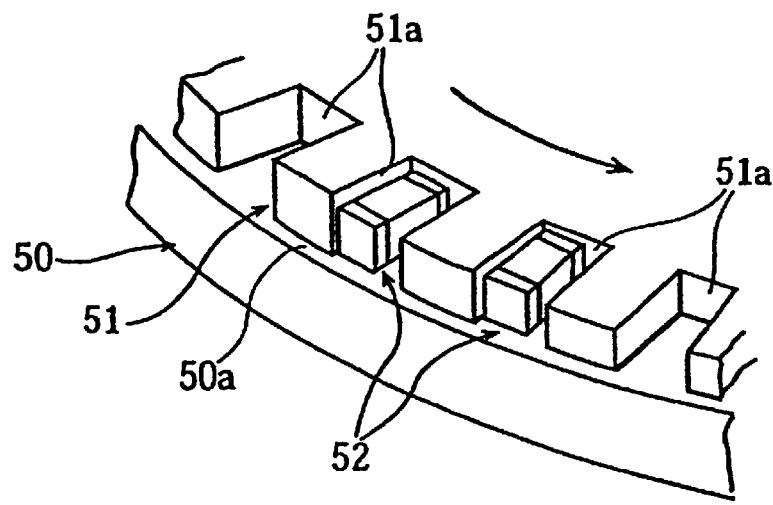
FIG. 9 is a perspective view of conventional chip receiving portions.
Figure 10:
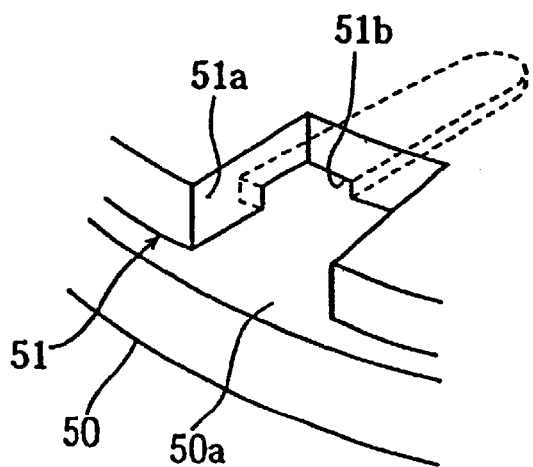
FIG. 10 is a perspective view of a conventional receiving concavity.
Figure 11A:
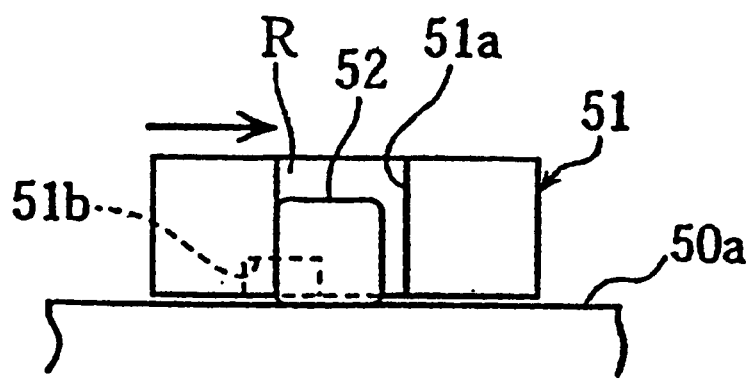
FIGS. 11A and 11B are schematic representations for explaining a problem of the conventional type.
Figure 11B:
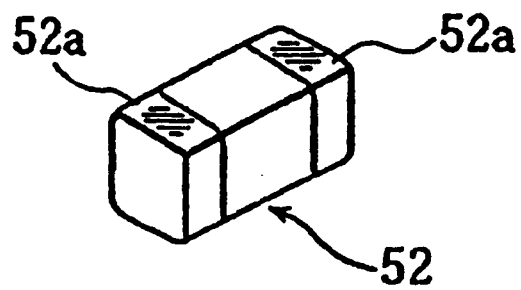

FIGS. 1 to 7 are drawings illustrating and explaining a measuring and classifying apparatus (transferring apparatus) for chips according to an embodiment of the present invention. FIG. 1 is a schematic diagram of the measuring and classifying apparatus; FIG. 2 is a perspective view of chip receiving portions; FIG. 3 is a cross-sectional view of the chip receiving portion (a sectional view of FIG. 2 cut along line III—III); FIG. 4 is a front elevational view of the chip receiving portions; FIG. 5 is a perspective view of the receiving concavities formed in a turntable; and FIGS. 6 and 7 are perspective views of a measuring device.

In the figures, reference numeral 1 denotes the measuring and classifying apparatus, which has a construction such that a turntable 4 is rotatably disposed on an upper surface 2a of an immovable base 2. The turntable 4 sequentially transfers chip-type electronic components (which will be referred to as chips in the following descriptions) 3 having a rectangular shape to work stations A, B, and C. The work stations A, B, and C are constructed such that predetermined operations, such as measurements, tests, processings, etc., are performed therein. In the work station A, for example, a measuring device 5 for measuring the electrical characteristics of the chips 3 is provided.

As shown in FIGS. 6 and 7, the above-described measuring device 5 includes a probe unit 6 and a driving mechanism 7 for driving the probe unit 6 in the vertical direction. The driving mechanism 7 is constructed such that a slide plate 9 is fixed to an immovable bracket 8, and a slide bearing 10 is attached to the slide plate 9 in a manner slidable in the vertical direction. In addition, a band-like shaped slider 11, which extends in the horizontal direction, is fixed to the slide bearing 10. A magnet 12 is attached to an end of the slider 11, and the probe unit 6 is attached to the other end.

The above-described probe unit 6 is constructed such that first and second sensor terminals 16 and 17 are inserted in a terminal block 15 in a manner moveable in the vertical direction and are pressed upward by pressuring springs 18. The probe unit 6 is disposed below the immovable base 2 in such a manner that the sensor terminals 16 and 17 can be projected and retracted through through-holes 2b formed in the immovable base 2. The sensor terminals 16 and 17 are connected to a measuring instrument via lead wires.

When the chips 3 are transferred to the work station A, the slider 11 is moved upward by the magnet 12, and the sensor terminals 16 and 17 are projected from the upper surface 2a of the immovable base 2. Thus, the sensor terminals 16 and 17 come into contact with electrodes 3a of the chip 3, and a predetermined measurement is performed. When the measurement is completed, the slider 11 is moved downward, and the sensor terminals 16 and 17 are retracted and are disposed inside the immovable base 2.

The turntable 4 has a round shape, and receiving concavities 4a having a rectangular shape are formed in the periphery of the turntable 4 at predetermined intervals. The height and width of the receiving concavities 4a are set to be larger than the outside size of the chips 3.

A low-friction sheet 20 formed of TEFLON, etc., is disposed on the upper surface of the turntable 4, so that the upper sides of the receiving concavities 4a are covered. In addition, an upper plate 21 formed of rubber, etc., is disposed on the low-friction sheet 20. The chips 3 are disposed in storage spaces surrounded by the receiving concavities 4a formed in the turntable 4, the upper surface 2a of the immovable base 2, and the low-friction sheet 20.

The turntable 4 is provided with suction passes 4b, which extend in the radial direction, in the upper surface thereof at positions corresponding to the receiving concavities 4a. Each of the suction passes 4b is formed by removing a part of the turntable 4 at the upper left corner of each of the receiving concavities 4a. The upper sides of the suction passes 4b are tightly sealed by the low-friction sheet 20 and the upper plate 21. Accordingly, the chips 3 are positioned by upper corner portions R of the receiving concavities 4a and the low-friction sheet 20, and the chips 3 are chucked in such a manner that gaps are provided between the chips 3 and the upper surface 2a of the immovable base 2.

The above-described suction passes 4b are connected to a common vacuum pass 2c formed in the immovable base 2 via suction holes 4b', and a vacuum pump (not shown) is connected to the vacuum pass 2c at the end thereof. The vacuum pass 2c has a length sufficient enough to extend from a supply station of the chips 3 to an output station thereof.

In addition, the suction passes 4b are individually provided with compressed air outlets 4c, which are connected to a compression pump (not shown) via a common compressed air pass 2d formed in the immovable base 2. The common compressed air pass 2d is constructed such that compressed air outlets 4c are connected thereto when the turntable 4 is positioned at the output station.

In the measuring and classifying operation using the above-described measuring and classifying apparatus 1, the chips 3 are first supplied to the receiving concavities 4a at the supply station. The chips 3 are positioned and retained by the upper corner portions R of the receiving concavities 4a and the low-friction sheet 20 due to the vacuum suction force, and the turntable 4 sequentially transfers the chips 3 to the work stations A to C. Predetermined operations, such as measurements, tests, processings, etc., are performed at the work stations A to C, and the chips 3 are then transferred to the output station at which compressed air is injected into the receiving concavities 4a and the chips 3 are expelled.

In the work station A, the first and second sensor terminals 16 and 17 project from the upper surface 2a of the immovable base 2 and measure the electronic characteristics of the chips 3. The upper plate 21 elastically deforms via the low-friction sheet 20 and absorbs an impact force applied by the sensor terminals 16 and 17, so that the chips 3 do not directly receive the impact force.

Accordingly, in the present embodiment, the suction passes 4b are formed at the upper corner of the receiving concavities 4a in the turntable 4. Thus, the chips 3 are chucked in such a manner that gaps are provided between the chips 3 and the upper surface 2a of the immovable base 2. Accordingly, the chips 3 can be transferred while being lifted above the immovable base 2, thereby reliably preventing the chips 3 from sliding on the immovable base 2 and scratches being formed on the electrodes 3a. Therefore, soldering defects in a mounting process can be prevented, and the quality reliability can be increased.

In addition, since the receiving concavities 4a are individually provided with the compressed air outlets 4c, the chips 3 can easily be taken out at the output station.

In addition, in the present embodiment, the upper sides of the receiving concavities 4a are covered by the low-friction sheet 20 formed of TEFLON, etc. Thus, the chips 3 can be smoothly chucked without being entrapped, etc., and easily and reliably be positioned.

In addition, the upper plate 21, which is constructed of an elastic material such as rubber, etc., is disposed on the upper surface of the low-friction sheet 20. Thus, the impact force applied by the sensor terminals 16 and 17 when they encounter the chips 3 in the work station A can be absorbed by the upper plate 21, so that fracture or chipping of the chips 3 can be prevented. Thus, the moving speed of the probe unit 6 in the vertical direction can be increased, providing improved measuring efficiency.

In addition, in the present embodiment, the low-friction sheet 20 and the upper plate 21 are adhered on the turntable 4 after the turntable 4 and the sensor terminals 16 and 17 are positioned. Thus, the turntable 4 and the sensor terminals 16 and 17 can easily be positioned, and measuring errors due to fabrication defects can be prevented.

Although an example of a measuring and classifying apparatus in which chips are classified by measuring the electrical characteristics thereof is explained in the above-described embodiment, the present invention is not limited to this. The present invention may also be applied to, for example, a component mounting apparatus in which the chips are transferred and mounted on printed circuit boards. The present invention may be applied to any types of apparatuses as long as the chips are transferred above an immovable base while being chucked by a transferring member.

In addition, although a case in which the chips are transferred by rotating the turntable is explained in the above-described embodiment, the present invention may also be applied to cases in which the chips are linearly transferred above an immovable base.

While the invention has been described in detail with reference to preferred embodiments thereof, it will be apparent to one skilled in the art that various changes can be made, and equivalents employed, without departing from the scope of the invention.

What is claimed is:

1. A transferring apparatus for chips, comprising:
    an immovable base; and
    a transferring member which is moveably disposed on the immovable base, and the transferring member being provided with receiving concavities for receiving the chips and with vacuum suction passes for chucking the chips;
    wherein the chips are transferred above the immovable base while being chucked in the receiving concavities upon application of suction to the vacuum suction passes, and
    wherein when suction is applied to the vacuum suction passes, the chips are chucked inside the receiving concavities at a side of the receiving concavities opposite to the immovable base.

2. A transferring apparatus for chips according to claim 1, wherein the receiving concavities further comprise compressed air outlets for expelling the chips from the receiving concavities upon application of compressed air through the compressed air outlets.

3. A transferring apparatus for chips according to claim 1, further comprising:
    an upper plate; and
    a low-friction sheet;
    wherein the upper sides of the receiving concavities formed in the transferring member are covered by the upper plate, and wherein the low-friction sheet is disposed between the upper plate and the receiving concavities.

4. A transferring apparatus for chips according to claim 3, wherein the upper plate is formed of a body formed of an elastic material which for absorbing an impact force when applied to the chips from below.

5. A transferring apparatus for chips according to claim 1, further comprising chips in said receiving concavities.

6. A transferring apparatus for chips according to claim 5, wherein the chips and the receiving concavities are mutually sized and configured so that, when the chips are chucked in the receiving concavities, gaps are provided between the chips and the immovable base.

7. A method of performing an operation on a chip-type electronic component, comprising the steps:
    receiving a chip-type electronic component in a receiving concavity of a transferring apparatus, the transferring apparatus including a turntable in which the receiving concavity is formed and a base, the receiving concavity located immediately adjacent to the base;
    applying suction to a portion of the receiving concavity to move the chip-type component into a side of the receiving concavity opposite the base and thereby forming a gap between the chip-type electronic component and the base;
    moving the turntable relative to the immovable base to thereby move the chip-type electronic component relative to the base without the chip-type electronic component touching the base; and
    performing an operation on the chip-type electronic component.

8. A method in accordance with claim 7, wherein the step of applying suction comprises applying suction to a corner of the receiving cavity.

9. A method in accordance with claim 7, wherein the turntable further comprises an plate formed of an elastic material positioned above the receiving concavity, and wherein the step of performing an operation on the chip-type electronic component comprises moving an operating member from the base and into contact with the chip-type electronic component, the operating member pushing the chip-type electronic component to deform the plate.

10. A method in accordance with claim 9, wherein the turntable further comprises a low-friction sheet between the plate and the receiving concavity, and wherein the step of pushing comprises deforming the plate through the low-friction sheet.

* * * * *